United States Patent [19]

Irvin et al.

[11] 4,310,983
[45] Jan. 19, 1982

[54] AUTOMATIC TIP UP FISHING DEVICE

[76] Inventors: Dee L. Irvin, Star Rte., White Lake, Wis. 54491; Walter C. Strong, Star Rte., Polar, Wis. 54468

[21] Appl. No.: 115,719

[22] Filed: Jan. 28, 1980

[51] Int. Cl.³ ............................................. A01K 85/01
[52] U.S. Cl. ............................................................. 43/17
[58] Field of Search ....................................... 43/17, 16

[56] References Cited

U.S. PATENT DOCUMENTS

| 1,253,746 | 1/1918 | Teeling | 43/17 |
| 2,089,097 | 8/1937 | Millett | 43/16 |
| 2,170,000 | 8/1939 | Eggleston | 43/17 |
| 2,759,287 | 8/1956 | Urban | 43/16 |
| 2,786,294 | 3/1957 | Whitacre | 43/17 |
| 3,163,954 | 1/1965 | Westin | 43/17 |
| 3,230,655 | 1/1966 | Nomsen | 43/17 |
| 3,888,035 | 6/1975 | Totten | 43/17 |

FOREIGN PATENT DOCUMENTS 764665 8/1967 Canada ..................................... 43/17

Primary Examiner—Stephen G. Kunin
Assistant Examiner—J. T. Zatarga
Attorney, Agent, or Firm—Recka & Joannes

[57] ABSTRACT

This ice fishing device comprises a housing, a shaft rotatably affixed to such housing, such shaft extending above and through the housing and into the water below, a removable articulated fishing rod attached to the end of the shaft that is below the water surface and biased so as to extend radially from the shaft, a device for rotating such shaft with its attached fishing rod through at least part of an arc, the arc being parallel to the surface of the water, below such surface, a signal device and a signal triggering device operative through the strike of a fish on the fishing line.

3 Claims, 8 Drawing Figures

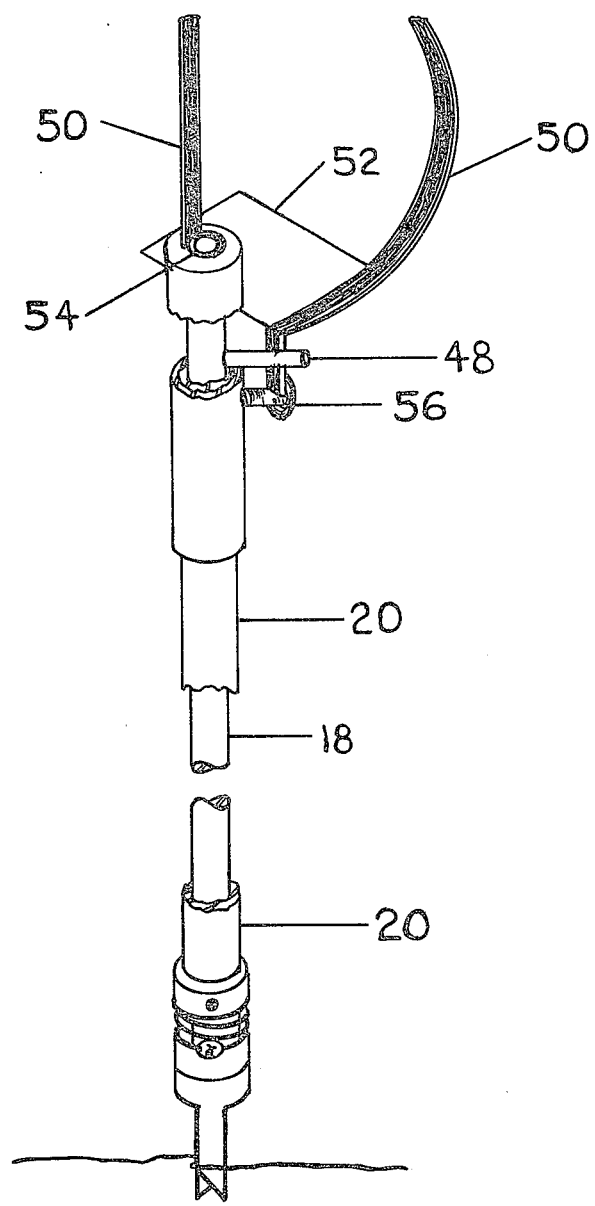
FIG. 5
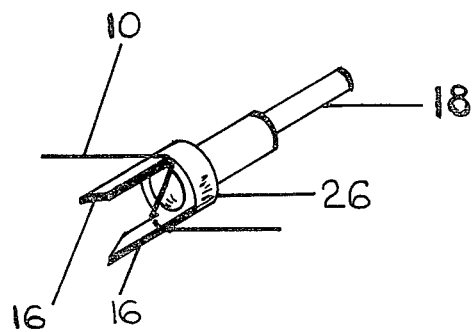
VIEW "A-A"
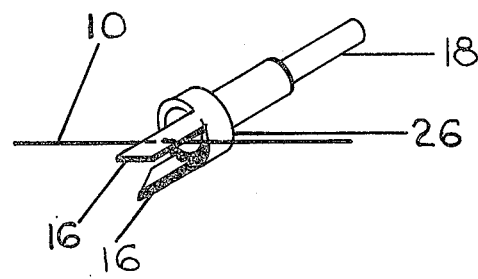
VIEW "B-B"

AUTOMATIC TIP UP FISHING DEVICE

BACKGROUND OF THE INVENTION

This invention relates to a removable, submersible, articulating ice fishing rod and reel with a connected signal, such signal adapted to be actuated by pulling on a fishing line carried by such rod and reel, such device also provides for rotary or reciprocal motion of a bait attached to said rod and reel below the surface of the ice.

It is an improvement of the well known ice fishing tip up in which a bait is hung below the ice surface on a fishing line, a strike on which causes a reel to turn and thereby trigger a signal to show that a fish has pulled on the bait.

BACKGROUND OF THE INVENTION

This invention relates to a device in which the reel is submersed below the surface of the water being fished in. Other devices of this type are shown in Totten U.S. Pat. No. 3,888,035 and Snodie U.S. Pat. No. 4,021,958.

Both of these devices provide a submersible reel and use as signal triggering means the turning of the reel when line is pulled out by a striking fish.

These devices allow the bait to hang only in a single position below the surface, the only position variation being depth. As signal triggering means they use linkage tied to movement of a fishing reel.

Petitioners' device allows fishing more in common with fishing as it would be practiced in warm weather. The bait is swung through an arc allowing the use of water movement actuated lures and on a strike the rod and reel may be removed from the device and used as in warm weather fishing to play a fish. To allow such below surface motion a triggering means had to be invented not dependent on movement of the reel.

SUMMARY

Petitioners' invention provides a submersible and demountable rod and reel combination together with a flagging mechanism in which the depth of submersion can be readily adjusted by a user.

The demountable rod and reel allow the playing of the fish by hand as should be done in warm weather fishing.

Petitioners' invention provides an economical and efficient signal tripping mechanism that trips upon movement of the fishing line.

Petitioners' invention further provides an articulated fishing device that allows a fish attracting lure to be swept through an arc below the surface of the water, thus attracting substantially more fish, than do current devices which simply allow the line to dangle straight down and with the bait lying stationary in the water.

Petitioners' invention further provides means whereby the rod and reel with its attached bait can be swept either in a rotary motion or in a reciprocal motion below the surface of the water while at the same time allowing a simple signal and signal triggering mechanism to be used.

The present invention comprises a housing that spans an ice fishing hole, driving means contained within that housing, a hollow drive shaft, mounted through said housing perpendicular to the ice, in operative connection to the driving means, an articulated fishing rod mounted on the end of such driven shaft and a tripping mechanism running through said hollow drive shaft to trip a warning flag, such tripping mechanism being operatively connected to a fishing line by means of a yoke through which the line passes.

FIG. 5 is a detailed view of the flag tripping mechanism, views "A—A" and "B—B" show the line catching yoke used to rotate the trip shaft to trip the tip up flag.

Figure 1:
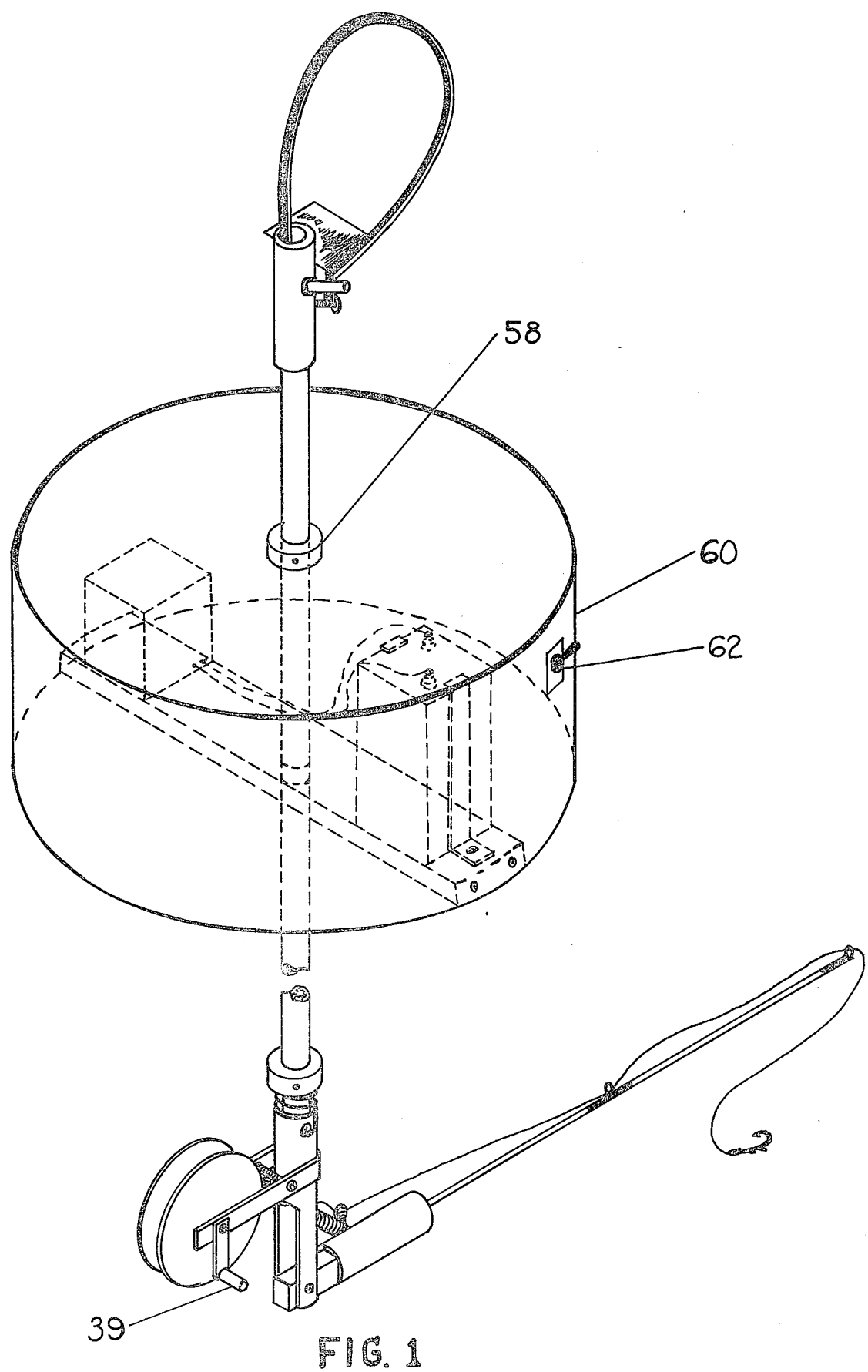
FIG. 1 is a shadow view of a preferred embodiment of the present invention showing detachable articulating fishing reel, optional drive means and flagging mechanism.

Referring to the drawings the preferred embodiment is formed of four principal parts, a housing 60 as shown in FIG. 1, a depth adjustable rotably mounted drive shaft 20, a fishing rod 32 and reel 34 and a flagging mechanism 52.

When a fisherman sets the device up for use, the shaft 20 is adjusted for depth below the water surface by loosening set collar 58 and driven pulley 76, setting depth by the amount of drive shaft 20 extending below the surface, and tightening set collar 58 and driven pully 76 at the desired position.

An articulating fishing rod 32, carrying fishing line 10, in reel 34 and having a hook 12 tied to such line 10, is demountably engaged on the end of drive shaft 20; within drive shaft 20 is trip shaft 18, the rotation of trip shaft 18 is the means by which flag 52 is triggered when a fish strikes line 10.

This triggering means comprises yoke 14, such yoke having yoke fingers 16 and 16', as shown in FIG. 5 view "A—A", fishing line 10 is run from reel 34 through line guide 43, around yoke finger 116 and 16', then through line guide 41 to the end of the rod 32. A pull on fishing line 10 causes the line to straighten and the yoke fingers 16 and 16' turn and cause trip shaft 18 to turn within trip shaft duct 53 rotating flag trip pin 48, which pushes flag spring 50 out of engagement with flag lock pin 56 thereby releasing flag 52. The rotation of Flap Trip pin 48 can as easily operate on-off switch of a light instead of releasing a flag when fishing is done in the dark.

Figure 4:
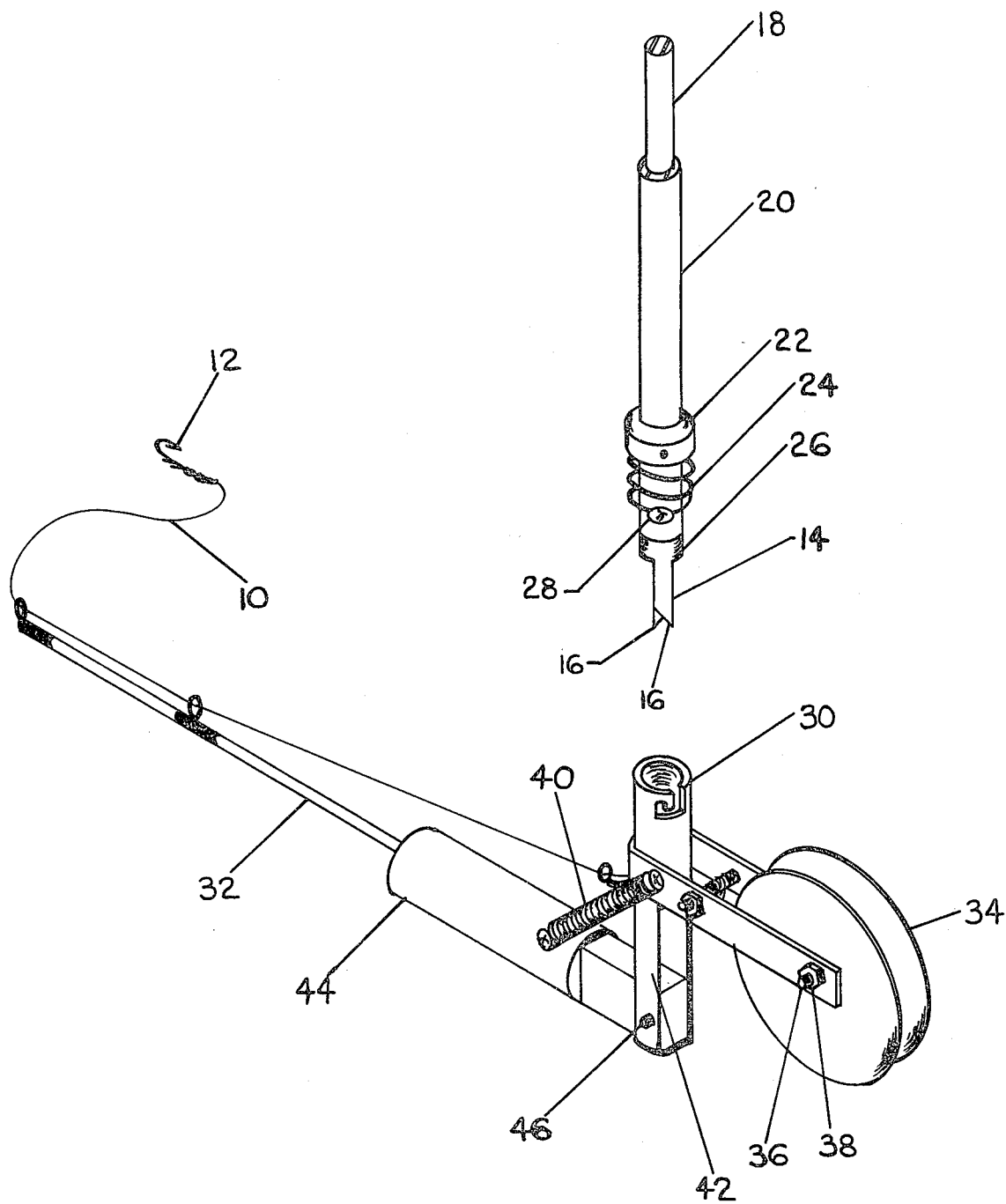
FIG. 4 is a view of the removable articulating fishing rod, and its means of attachment to the drive shaft.
Figure 6:
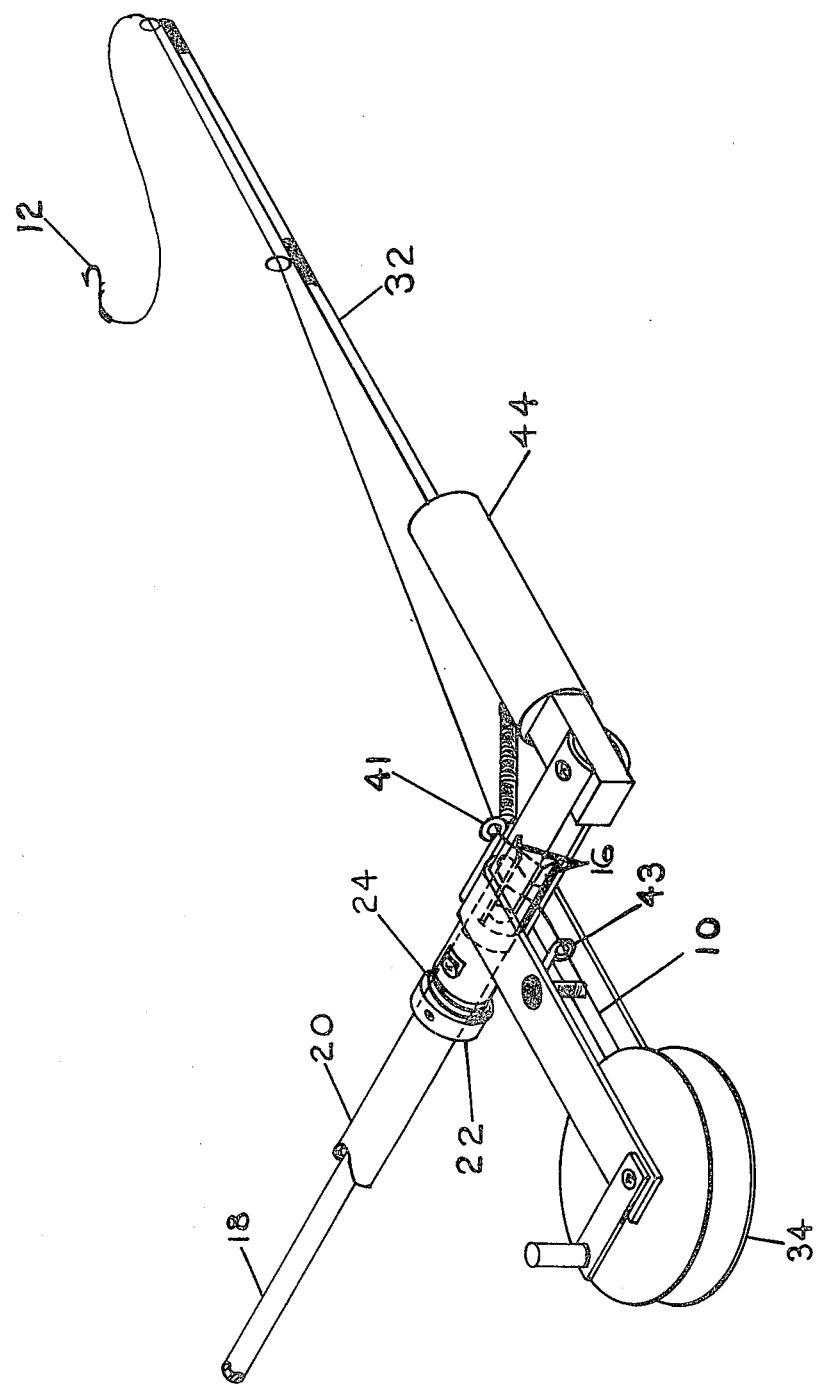
FIG. 6 is a view of the articulating fishing rod 32 with a shadow view of the tripping mechanism.

Mounted at the end of drive shaft 20 is collar 22. This collar 22 acts as the retainer for twist lock spring 24, which with rod locking pin 28 demountably retains fishing rod frame 42 to the end of drive shaft 20 with yoke body 26 being contained within fishing rod frame 42. The demountable connecting feature can best be seen as shown in FIG. 4. The fishing rod is demountably attached to the drive shaft 20 by a pin seat 30 formed in one end of the fishing rod frame and by a rod locking pin 28 mounted on the drive shaft. This is also shown most clearly in FIG. 4.

Fishing rod 32 is pivotally mounted to fishing rod frame 42. The rod can be pivoted through an arc of 90° from a position parallel to said frame to a position perpendicular to said frame so that the fishing rod 32 can be inserted in an ice fishing hole and while being inserted the fishing rod can be held parallel to the drive shaft 20 allowing the rod to go into a narrow hole rod control spring 40 biases the pivotally mounted rod to a position perpendicular to the axis of the fishing rod frame and drive shaft 20.

The fishing rod 32 comprises, reel 34, reel retaining screw 36, reel retaining nut 38, crank 39, rod control spring 40, fishing rod frame 42, fishing rod handle 44 and fishing rod handle pivot pin 46.

Housing 60, in this example, a plastic enclosure is used to span an ice hole, shaft 20 as stated earlier, as is shown in FIG. 1, is retained by collar 58 which is demountably attached to the circumference of the drive shaft 20 and which bears on the top surface of the housing 60 and by driven pulley 76. The plastic enclosure keeps wind driven snow from blowing into the hole and from freezing up.

Figure 2:
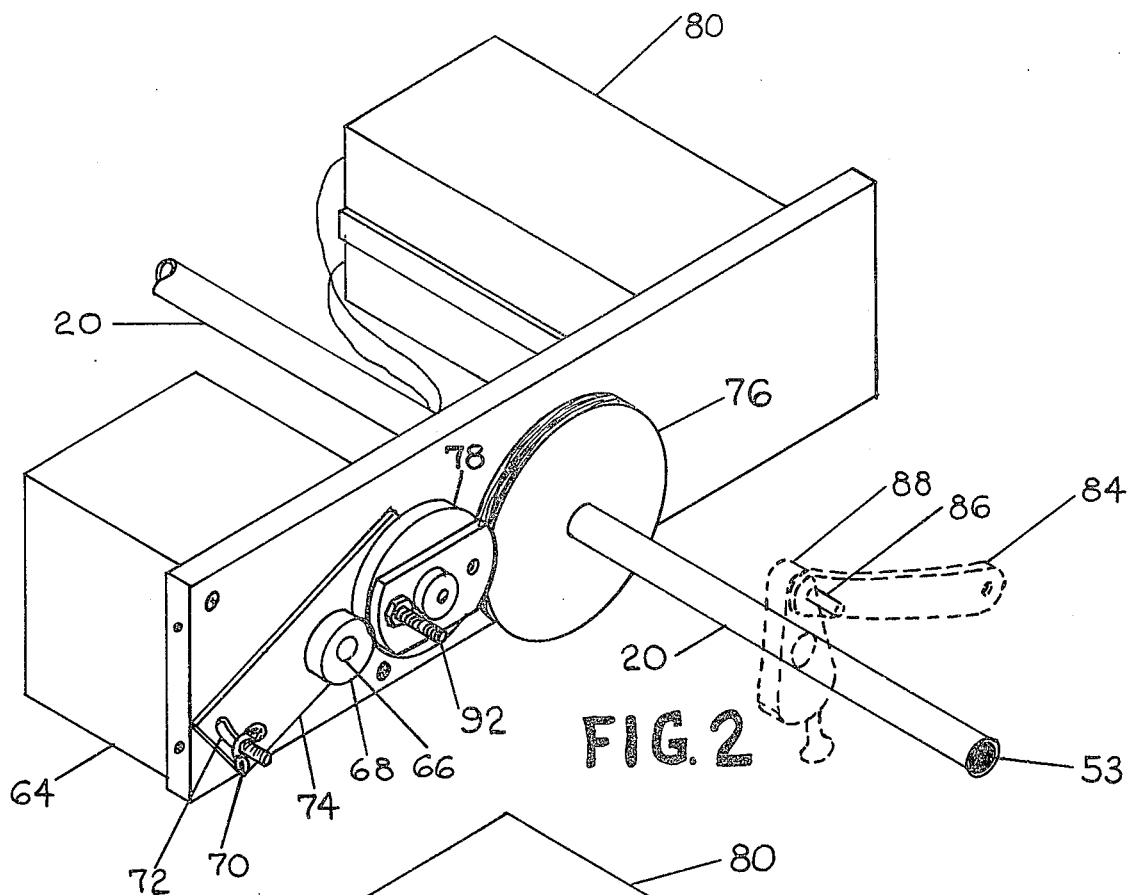
FIG. 2 is a perspective view of the drive mechanism of the optional drive means showing the means engaged for 360 degree movement.
Figure 3:
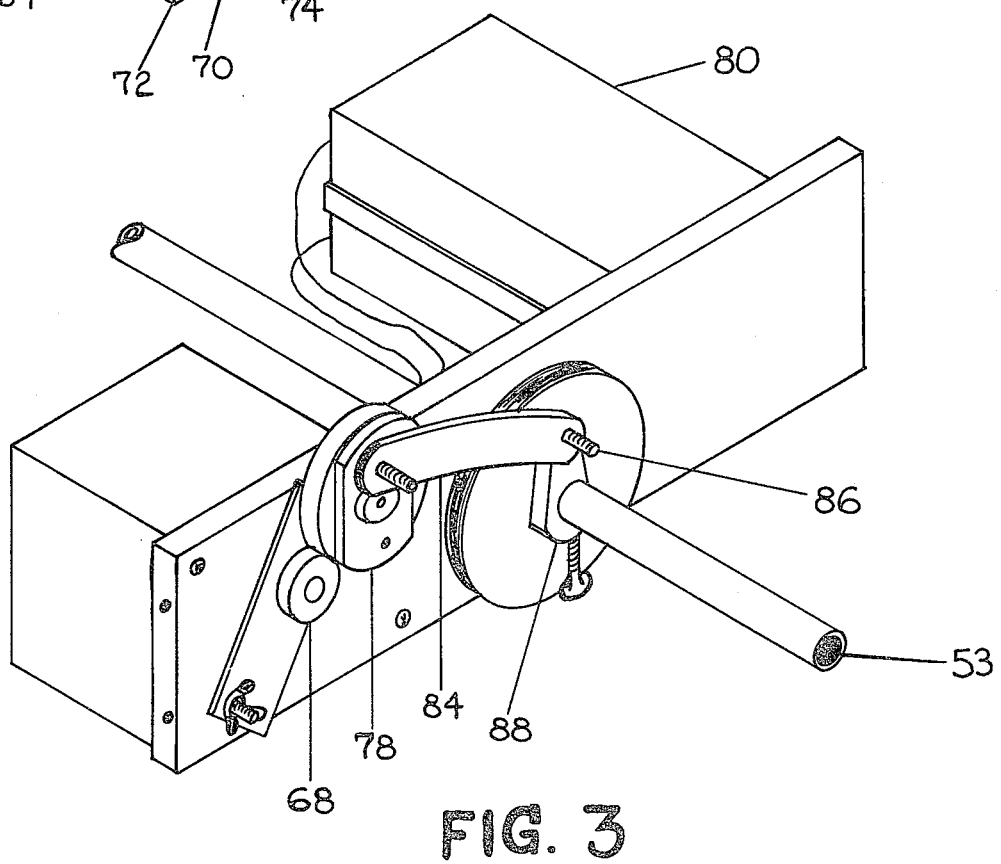
FIG. 3 is a perspective view of the drive mechanism of the optional drive means showing the means engaged for 120 degree movement.

An electrical off on switch 62 is connected to battery 80 and drive motor 64. Rotary or reciprocal motion of drive shaft 20 may be desired to cause the fishing rod 32 with its attached line 10 and hook 12 to sweep either back and forth horizontally through an arc of a circle or through 360 degrees. This motion is provided by drive means comprising electric gear head motor 64, motor shaft 66, drive pulley 68, intermediate pulley 78 and driven pulley 76 which is secured to drive shaft 20. In use the driven pulley 76 and the intermediate pulley 78 as depicted in FIG. 2, drive driven pulley 76 which causes drive shaft 20 to rotate through 360 degrees. The rotation causes the fish line 10 with is hook 12 to travel horizontal in a 360 arc about the center of the drive shaft 20.

To provide reciprocal motion of the drive shaft 20, shift lever 74 is moved to the side disengaging intermediate pulley 78, from the driven pulley 76, the shift lever is secured from moving by wing nut 70, shift lever 74 has pierced through it at the end opposite the intermediate pulley 78 an elongated quadrant slot 72, allowing such shift lever 74 to be moved through an arc so that it may be engaged at various positions.

Mounted on intermediate pulley 78 is crank pin 92, crank 88 is fixedly connected to shaft 20, crank arm 84 is pivotally connected to crank 88, pivot pin 86, through the linkage provided by intermediate gear 78, crank pin 92, crank arm 84, pivot pin 86 and crank 88. Movement of the intermediate gear 78 then causes only reciprocal motion of shaft 20.

In use a fisherman first adjusts depth, assembles and baits rod, and inserts the rod and reel combination on shaft, sets flag and places device over an ice fishing hole. The motor used in the preferred embodiment is a 6 volt gearhead motor output 5 R.P.M. The power source to such motor is a 6 volt lantern battery.

The device sweeps below the surface and when struck by a fish the flag is caused to raise by an ingenious mechanism not shown in prior art and after engaging a fish it is possible to play the fish as is done by a standard hand held fishing rod and reel.

We claim:

1. An ice fishing device comprising: a housing having a top and sides, the sides adapted to rest atop the ice and the housing bridging and covering the usual ice fishing hole which is formed in the ice;
   a hollow shaft having a distal end and a proximate end, said hollow shaft demountably affixed to and passing through said housing, the longitudinal axis of said hollow shaft being generally perpendicular to said housing and the water below; the distal end of said hollow shaft extending into the water, the proximate end of said hollow shaft extending above such housing;
   signal means connected to the proximate end of said hollow shaft;
   a fishing rod comprising a fishing rod frame, a fishing rod handle pivotally attached to such frame, a reel for fishing line and fishing line such being mounted on the distal end of said hollow shaft, such fishing rod handle being spring biased into a direction generally perpendicular to the longitudinal axis of said hollow shaft and projecting radially therefrom
   signal triggering means responsive to a pull on a fishing line comprising;
   an internal shaft mounted within the hollow shaft; such internal shaft having a distal end and a proximate end;
   the proximate end of said internal shaft having a projection extending radially therefrom;
   the distal end of said internal shaft having formed thereon a yoke, the fishing line being threaded through such yoke, such yoke being located between the fishing rod handle and the reel whereby a pull on the line causes the yoke to turn the internal shaft with its radial projection actuating the signal means.

2. An ice fishing device comprising: a housing having a top and sides, the sides adapted to rest atop the ice and the housing bridging and covering the usual ice fishing hole which is formed in the ice;
   a hollow shaft having a distal end and a proximate end, said hollow shaft demountably affixed to and passing through said housing, the longitudinal axis of said hollow shaft being generally perpendicular to said housing and the water below; the distal end of said hollow shaft extending into the water, the proximate end of said hollow shaft extending above such housing;
   signal means connected to the proximate end of said hollow shaft;
   a fishing rod comprising a fishing rod frame, a fishing rod handle pivotally attached to such frame, a reel for fishing line and fishing line such being mounted on the distal end of said hollow shaft, such fishing rod handle being spring biased into a direction generally perpendicular to the longitudinal axis of said hollow shaft and projecting radially therefrom
   means for rotating such hollow shaft radially about an axis passing longitudinally through such shaft comprising:
   a electric motor;
   means for providing power to said motor;
   a drive pulley operatively connected to said motor and frictionally connected to the circumference of said hollow shaft so that turning of such pulley causes such shaft to turn through 360°.
   signal triggering means responsive to a pull on a fishing line comprising;
   an internal shaft mounted within the hollow shaft; such internal shaft having a distal end and a proximate end;
   the proximate end of said internal shaft having a projection extending radially therefrom;
   the distal end of said internal shaft having formed thereon a yoke, the fishing line being threaded through such yoke, such yoke being located between the fishing rod handle and the reel whereby a pull on the line causes the yoke to turn the internal shaft with its radial projection actuating the signal means.

3. An ice fishing device comprising: a housing having a top and sides, the sides adapted to rest atop the ice and the housing bridging and covering the usual ice fishing hole which is formed in the ice;
- a hollow shaft having a distal end and a proximate end, said hollow shaft demountably affixed to and passing through said housing, the longitudinal axis of said hollow shaft being generally perpendicular to said housing and the water below; the distal end of said hollow shaft extending into the water, the proximate end of said hollow shaft extending above such housing;
- signal means connected to the proximate end of said hollow shaft;
- a fishing rod comprising a fishing rod frame, a fishing rod handle pivotally attached to such frame, a reel for fishing line and fishing line such being mounted on the distal end of said hollow shaft, such fishing rod handle being spring biased into a direction generally perpendicular to the longitudinal axis of said hollow shaft and projecting radially therefrom
- means for rotating said hollow shaft radially about an axis passing longitudinally through such shaft through at least part of an arc thereby operative to swing the fishing rod handle through an arc parallel to the surface of the water and radially extending outwardly from said hollow shaft comprising:
- a electric motor;
- means for providing power to said motor;
- a drive pulley operatively connected to said motor and frictionally connected to the circumference of said hollow shaft so that turning of such pully causes such shaft to turn through 360°
- signal triggering means responsive to a pull on a fishing line comprising;
- an internal shaft mounted within the hollow shaft; such internal shaft having a distal end and a proximate end;
- the proximate end of said internal shaft having a projection extending radially therefrom;
- the distal end of said internal shaft having formed thereon a yoke, the fishing line being threaded through such yoke, such yoke being located between the fishing rod handle and the reel whereby a pull on the line causes the yoke to turn the internal shaft with its radial projection actuating the signal means.

* * * * *